United States Patent
Onaka et al.

(10) Patent No.: US 7,751,119 B2
(45) Date of Patent: Jul. 6, 2010

(54) OPTICAL SURGE SUPPRESSIVE TYPE OPTICAL AMPLIFIER

(75) Inventors: Miki Onaka, Kawasaki (JP); Etsuko Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/197,631

(22) Filed: Aug. 25, 2008

(65) Prior Publication Data

US 2008/0310011 A1 Dec. 18, 2008

Related U.S. Application Data (60) Division of application No. 11/896,992, filed on Sep. 7, 2007, now abandoned, which is a continuation of application No. PCT/JP2005/003859, filed on Mar. 7, 2005.

(51) Int. Cl.
H04B 10/17 (2006.01)
H04B 10/12 (2006.01)

(52) U.S. Cl. ............... 359/341.43; 359/337; 359/337.4; 359/341.5

(58) Field of Classification Search ............. 359/337, 359/337.4, 341.5, 341.43
See application file for complete search history.

(56) References Cited

U.S. PATENT DOCUMENTS

| 5,764,406 | A | * | 6/1998 | Newhouse et al. | ....... 359/337.4 |
| 5,986,799 | A | * | 11/1999 | Itou et al. | ................... 359/337 |
| 6,172,801 | B1 | | 1/2001 | Takeda | |
| 2002/0001124 | A1 | * | 1/2002 | Kinoshita et al. | ........ 359/337.1 |
| 2002/0114600 | A1 | | 10/2002 | Aiso | |
| 2003/0174391 | A1 | * | 9/2003 | Pan et al. | ............... 359/341.41 |

FOREIGN PATENT DOCUMENTS

EP 1189316 3/2002

(Continued)

OTHER PUBLICATIONS

Myslinski, "Performance of High-concentration erbium-doped fiber amplifiers", IEEE Photonics Technology Letters, vo. 11, No. 8, pp. 973-975 Aug. 1999.*

(Continued)

*Primary Examiner*—Eric Bolda
(74) *Attorney, Agent, or Firm*—Hanify & King, PC (57) ABSTRACT

According to an optical surge suppressive type optical amplifier in the present invention, for a WDM optical amplifier having a multi-stages amplification configuration in which a plurality of optical amplifying means is connected in series, an optical amplifying medium capable of causing a homogeneous up-conversion (HUC) phenomenon is applied to the optical amplifying means on the signal light output side, so that an optical surge is suppressed utilizing the degradation of gain efficiency by the HUC caused at the time when the input power is decreased. Further, for a one wave optical amplifier, an optical amplifying medium capable of causing a pair induced quenching (PIQ) phenomenon is applied to the optical amplifying means on the signal light input side, so that the optical surge is suppressed utilizing the degradation of output power efficiency by the PIQ caused at the time when the input power is increased. As a result, it is possible to provide a low cost optical amplifier capable of effectively suppressing the optical surge without leading the complexity of control circuit or optical circuit configuration.

9 Claims, 7 Drawing Sheets

FOREIGN PATENT DOCUMENTS

| | | | |
|---|---|---|---|
| EP | 11893161 | B1 | 3/2002 |
| JP | 05-063259 | | 3/1993 |
| JP | 5063259 | | 3/1993 |
| JP | 07162062 | | 6/1995 |
| JP | 20029376 | | 1/2002 |
| JP | 2002111104 | | 4/2002 |
| JP | 2003-209308 | * | 7/2003 |
| JP | 2003209308 | | 7/2003 |
| JP | 2004-047785 | | 2/2004 |
| JP | 200447785 | | 2/2004 |
| JP | 2004244280 | | 9/2004 |
| WO | 00/74184 | A1 | 12/2000 |

OTHER PUBLICATIONS

Myslinski, P. et al., Lightwave Technology, Journal of, vol. 15, Issue I, Jan 1997; "Effects of Concentration on the Performance of Erbium-Doped Fiber Amplifiers".

Nakazawa, M. et al., "Lanthanum codoped erbium fibre amplifier, Electronics Letters,", 1999, vol. 27, No. 12, pp. 1065-1067.

Philipsen, et al., Quantum Electronics, IEEE Journal of, vol: 35, Issue: 11,0bservation of Strongly Nonquadratic Homogeneous Upconversion in Er3+-Doped Silica Fibers and Reevaluation of the Degree of Clustering, Nov 1999; pp. 1741-1749.

Tian, C. et al., Lightwave Technology, Journal of, vol: 21, Issue: 8; Aug 2003;Analysis and Control of Transient Dynamics of EDFA Pumped by 1480-and 980-nm Lasers;.

Townsend, J.E et al., "YB3+sensitized Er3+doped silica optical fibre with ultrahigh transfer efficiency and gain, "Electronics Letters1, 991, vol. 27; No. 21, pp. 1958-1959.

Non-Final Office Action dated Mar. 25, 2008 received in U.S. Appl. No. 11/896,992

International Search Report issued in corresponding PCT/JP2005/003859 dated Jun. 21, 2005.

Japanese Office Action dated Nov. 10, 2009 received in the corresponding Japanese Patent Appln. No. 2007-506928.

* cited by examiner

FIG.1

UP-CONVERSION PHENOMENON

FIG.2

HOMOGENEOUS UP-CONVERSION (HUC)

PAIR INDUCED QUENCHING (PIQ)

OPTICAL SURGE SUPPRESSIVE TYPE OPTICAL AMPLIFIER

CROSS-REFERENCE TO RELATED APPLICATIONS

This application is a divisional of application Ser. No. 11/896,992, filed on Sep. 7, 2007 now abandoned, which is a continuation of PCT/JP2005/003859, filed on Mar. 7, 2005.

BACKGROUND OF THE INVENTION

1. Field of the Invention

The present invention relates to an optical amplifier for amplifying a signal light while suppressing an optical surge in an optical communication system, and in particular, to an optical amplifier for suppressing the optical surge utilizing an up-conversion phenomenon in an optical amplifying medium.

2. Description of the Related Art

Figure 12:
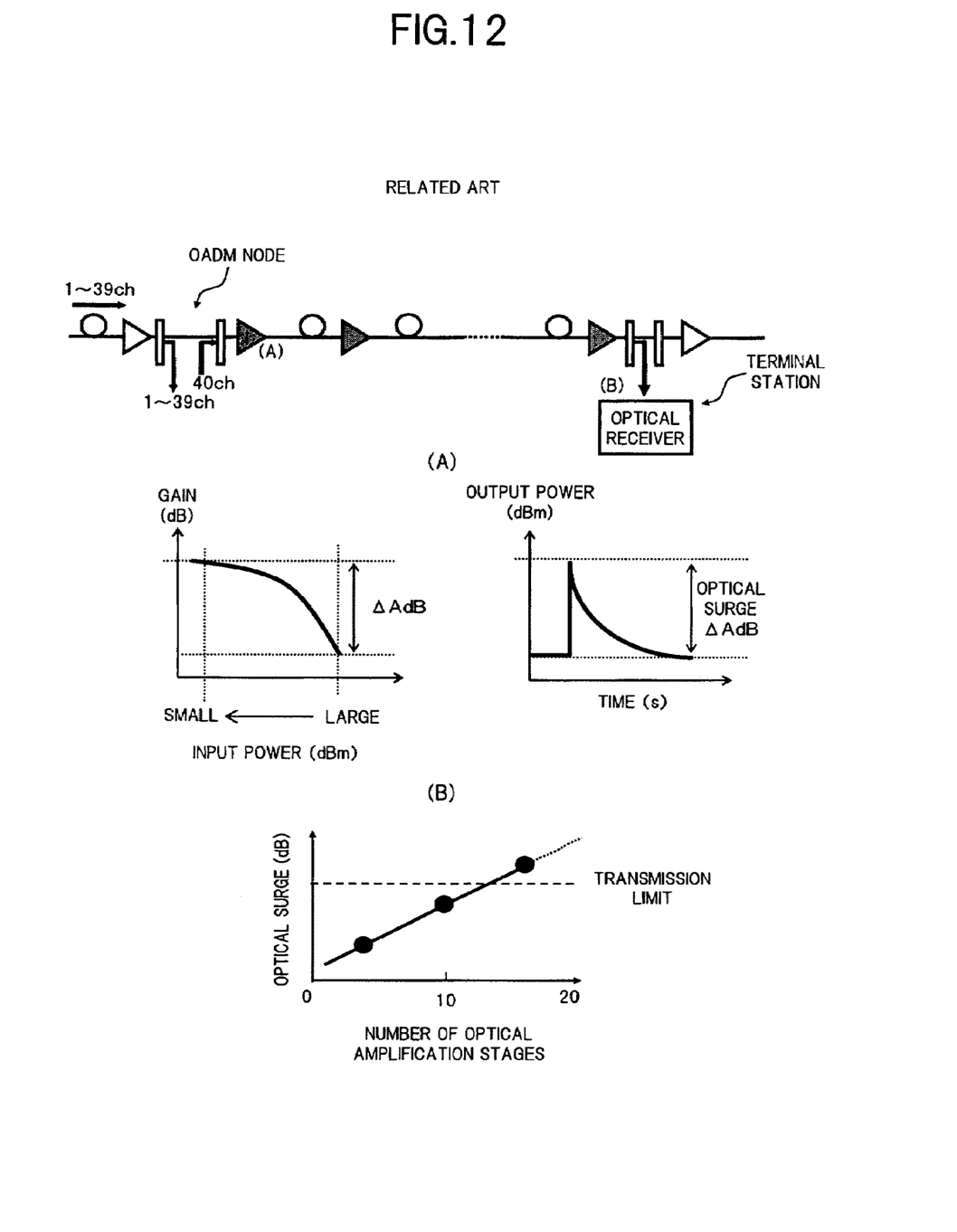
FIG. 12 is a diagram for explaining an occurrence of optical surge in a conventional optical amplifier.

In recent years, a demand for communications traffic is drastically increased with the development of multimedia networks, and an optical transmission system for multi-repeatedly amplifying a signal light using optical amplifiers, has a large role for achieving the economization of communication system in the multimedia society. An optical amplifier is a key device taking a role in the large-capacity and long-distance of the optical transmission system. However, if the input power to the optical amplifier is dynamically changed, there occurs a transient output peak due to gain saturation characteristics to the input power of the optical amplifying medium. As shown in FIG. 12 for example, in a metropolitan area network system or the like in which the number of signal wavelengths (the number of channels) contained in a wavelength division multiplexed (WDM) light is dynamically changed, in the case where the 1st ch. to the 39th ch. are dropped by an optical add/drop multiplexer (OADM) node which has added the 40th ch. to the WDM light containing the 1st ch. to the 39th ch. resulting in that the number of channels in the WDM light to be input to the optical amplifier arranged on the output side of the OADM node is changed to 1 channel from 40 channels, the optical amplifier becomes in a high gain state with a decrease of the total input power, to generate the optical output power of higher level compared with a stationary output power level at the operation time of 40 channels. (the middle stage of FIG. 12.). Such a spike optical output power variation is generally called an optical surge, and an occurrence amount of the optical surge corresponds to a gain difference $\Delta A[dB]$. Further, the optical surge occurred in the optical amplifier is accumulated after passing through a downstream repeating amplifier, to be further increased. As a result, an input signal level to a light receiver at a terminal station problematically exceeds a received light level upper limit value (the lower stage of FIG. 12), leading the degradation of received Q-value.

As a conventional technology for coping with such a problem, there has been known a method of controlling the pumping light power at a high speed (refer to Cechan Tian et al., "Analysis and Control of Transient Dynamics of EDFA Pumped by 1480- and 980 mm Lasers" JOURNAL OF LIGHTWAVE TECHNOLOGY, VOL. 21, NO. 8, AUGUST 2003) or a method of clamping a gain (refer to Japanese Unexamined Patent Publication No. 10-200182).

To be specific, for the high speed control method of the pumping light power, there has been reported a method of adding a feedforward control to a typical feedback control of the pumping light power to increase a control speed, thereby suppressing the optical surge. For the gain clamping method, there has been proposed a method of discharging the pumping light energy due to the high gain state as the oscillation energy by providing an optical circuit configuration in which a gain or the reflectance of a specific wavelength other than a signal light is increased. Furthermore, there has also been reported a method of suppressing the high gain state by inputting a saturation signal of specific wavelength other than a signal light to an optical amplifier based on a monitoring result of the input power.

As described in the above, to the subject of the suppression of optical surge occurred in the optical amplifier, in the conventional technology, measures have been attempted from the view points of both of the control circuit configuration and the optical circuit configuration.

However, the conventional optical surge suppressing technology as described above has following problems. In the high speed control method of the pumping light power, there is a problem of residual optical surge in that the optical surge occurring at a high speed of change is difficult to be suppressed, depending on the way of giving a control target value and a control circuit constant to arbitrarily changing operating conditions (for example, the number of signal wavelengths, the input power, the gain and the like). Further, in the gain clamping method, since the complexity of optical circuit configuration cannot be avoided, there is a problem of cost escalation or the like of the optical amplifier.

SUMMARY OF THE INVENTION

The present invention has been accomplished in view of the above problems, and has an object to provide, at a low cost, an optical amplifier capable of achieving the improvement of gain saturation characteristics themselves of an optical amplifying medium, which are factors of occurring an optical surge, to thereby effectively suppress the optical surge without the complexity a control circuit configuration or an optical circuit configuration.

In order to achieve the above object, one aspect of an optical surge suppressive type optical amplifier according to the present invention, comprises; a plurality of optical amplifying means, each including an optical amplifying medium doped with at least rare-earth ions and a pumping section that supplies a pumping light to the optical amplifying medium, for amplifying a wavelength division multiplexed light input thereto by the stimulated emission of the rare-earth ions pumped by the pumping light from the pumping section, and the respective optical amplifying means are connected in series. Further, in the optical amplifying means arranged on the signal light output side among the plurality of optical amplifying means, the optical amplifying medium is doped with the rare-earth ions substantially in uniform in high concentration within a predetermined region thereof, to be provided with a structure capable of causing a phenomenon in which the gain efficiency degradation is increased as a gain becomes larger, to thereby suppress an optical surge by the degradation of gain efficiency utilizing the phenomenon which is caused when the power of the input wavelength division multiplexed light is decreased.

In the optical surge suppressive type the optical amplifier of such a configuration, as the optical amplifying medium for amplifying the wavelength division multiplexed light, the one provided with the structure capable of causing, for example a homogeneous up-conversion phenomenon is used, so that an extra gain increase occurring when the input power is decreased, is suppressed by the degradation of the high-speed gain efficiency in the non-radiation process based on the homogeneous up-conversion phenomenon, and therefore, it becomes possible to suppress the optical surge. Further, the optical amplifying medium as described above is applied to the optical amplifying means arranged on the signal light output side among the plurality of optical amplifying means connected in series, so that an increase of the pumping light power necessary for realizing a required gain can be suppressed.

Further, another aspect of the optical surge suppressive type optical amplifier according to the present invention, comprises; a plurality of optical amplifying means each including an optical amplifying medium doped with rare-earth ions and a pumping section that supplies a pumping light to the optical amplifying medium, for amplifying a signal light of single wavelength input thereto by the stimulated emission of the rare-earth ions pumped by the pumping light from the pumping section, and the respective optical amplifying means are connected in series. Further, in the optical amplifying means arranged on the signal light input side among the plurality of optical amplifying means, the optical amplifying medium is doped with the rare-earth ions in high concentration within a predetermined region thereof, to be provided with a structure capable of causing a phenomenon in which the output power efficiency degradation is increased as the input power becomes larger, to thereby suppress an optical surge by the degradation of output power efficiency utilizing the phenomenon which is caused when the power of the input signal light is increased.

In the optical surge suppressive type optical amplifier of the above configuration, as the optical amplifying medium for amplifying the signal light of single wavelength, the one provided with a structure of capable of causing, for example a pair induced quenching phenomenon is used, so that, even when the power of the input signal light is abruptly increased by the optical surge, the optical surge output from the optical amplifier can be suppressed by the degradation of the high-speed output power efficiency in the non-radiation process based on the pair induced quenching phenomenon.

According to the optical surge suppressive type optical amplifier of the present invention as described in the above, by utilizing the phenomena of up-conversion having a high response speed and the like, the gain saturation characteristics themselves of the optical amplifying medium are improved, and therefore, it is possible to provide, at a low cost, a wavelength division multiplexed light amplifier or a one wave optical amplifier capable of effectively suppressing the optical surge with a simple configuration.

The other objects, features, advantages and various aspects of the present invention will become more apparent from the ensuing description of preferred embodiments with reference to the accompanying drawings.

DESCRIPTION OF THE PREFERRED EMBODIMENTS

There will be described embodiments for implementing an optical surge suppressive type optical amplifier according to the present invention, with reference to the accompanying drawings.

Firstly, there will be described an up-conversion phenomenon of an optical amplifying medium as one realization example of phenomena to be utilized for the suppression of an optical surge in the present invention.

Figure 1:
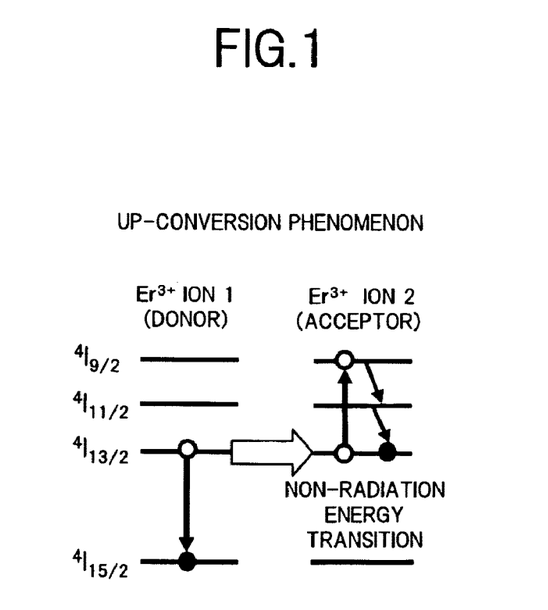
FIG. 1 is a conceptual diagram for explaining an up-conversion phenomenon of an optical amplifying medium to be utilized for suppressing an optical surge in the present invention.

As shown in a conceptual diagram of FIG. 1 for example, the up-conversion phenomenon is a known physical phenomenon in which, in an optical amplifying medium doped with rare-earth ions such as erbium ions ($Er^{3+}$) or the like, if $Er^{3+}$ is doped in high concentration, one of two $Er^{3+}$ in an excitation level ($^4I_{13/12}$) is transited to a base level while the other $Er^{3+}$ being transited to a further upper level ($^4I_{9/2}$) not to participate in the amplification of a signal light, by an inter-ionic interaction (refer to article 1: Jacob L. Philipsen et al., "Observation of Strongly Nonquadratic Homogeneous Upconversion in $Er^{3+}$-Doped Silica Fibers and Reevaluation of the Degree of Clustering", IEEE JOURNAL OF QUANTUM ELECTRONICS, VOL. 35, NO. 11, NOVEMBER 1999, and article 2: Piotr Myslinski et al., "Effects of Concentration on the Performance of Erbium-Doped Fiber Amplifiers" JOURNAL OF LIGHTWAVE TECHNOLOGY, VOL. 15, NO. 1, JANUARY 1997).

Figure 2:
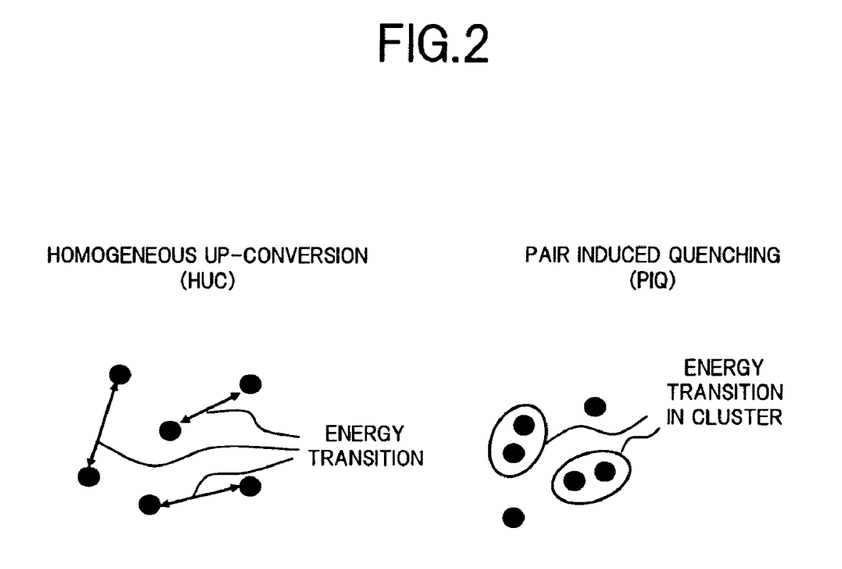
FIG. 2 is a conceptual diagram for explaining the homogeneous up-conversion (HUC) and the pair induced quenching (PIQ) each of which is one example of realizing means of the present invention.

The above up-conversion phenomenon can be classified into the homogeneous up-conversion (HUC) and the pair induced quenching (PIQ) depending on causing mechanisms thereof. In the HUC, as shown in the left side of a conceptual diagram of FIG. 2, the rare-earth ions doped in high concentration are distributed substantially in uniform within a predetermined region (for example, a core or the like of an optical fiber), and the up-conversion phenomenon shown in FIG. 1 is caused by the energy transition between two or more rare-earth ions. On the other hand, in the PIQ, as shown in the right side of the conceptual diagram of FIG. 2, two or more rare-earth ions doped in high concentration form a duster, and the up-conversion phenomenon shown in FIG. 1 is caused by the energy transition between ions in the same duster. Incidentally, the duster means a state where some rare-earth ions are arranged in proximal distances for each certain number of rare-earth ions.

Conventionally, the up-conversion phenomenon as described above degrades the gain efficiency (a value obtained by dividing a gain [dB] by the pumping light power [mW]) of an optical amplifier, and therefore, is a restricting factor of the realization of a high output power optical amplifier. Namely, in the conventional optical amplifier, in order to suppress a nonlinear phenomenon with the high output power, measures have been made for increasing a doping amount of rare-earth ions for the optical amplifying medium to thereby increase the gain per unit length so that the length of the optical amplifying medium to be used is shortened. However, as described above, since the gain efficiency is degraded (concentration quenching) by the up-conversion phenomenon with the increase of the doping amount of rare-earth ions, the high output power of the optical amplifier is restricted. Therefore, for the conventional optical amplifier, there have been proposed various technologies for suppressing the up-conversion phenomenon due to the high concentration of rare-earth ions (refer to Japanese Unexamined Patent Publication Nos. 2002-111104, 2002-9376 and 2002-244280).

Contrary to the conventional technology aiming at the suppression of the up-conversion phenomenon as described above, the present invention takes notice of characteristics in that the degradation of gain efficiency due to the up-conversion phenomenon occurs at a response speed in nanosecond [ns] order, and therefore, newly proposes the utilization of the up-conversion phenomenon of the optical amplifying medium as means for suppressing the optical surge.

As shown in FIG. 12, in a WDM optical amplifier using a normal optical amplifying medium, when the optical amplifier becomes in a high gain state as a result that the input power thereto is decreased due to a change in the number of channels of an input WDM light, there occurs the optical surge corresponding to a gain difference $\Delta A[dB]$. To such an optical surge, one aspect of the present invention utilizes an optical amplifying medium capable of causing the HUC (to be referred to as a HUC optical amplifying medium) as suppressing means. By configuring the WDM optical amplifier using the HUC optical amplifying medium, as shown by a solid line of FIG. 3 for example, it is possible to suppress an increase of extra gain for when the input power is decreased by the change in the number of channels of the WDM light. The degradation of gain efficiency at this time occurs at the response speed in nanosecond order, and therefore, as shown by a solid line of FIG. 4 for example, it becomes possible to suppress an occurrence amount of the optical surge output from the optical amplifier to $\Delta B$. Incidentally, broken lines of FIG. 3 and FIG. 4 each shows characteristics for the case of using the normal optical amplifying medium in which the HUC is not caused.

A gain $G_{HUC}$ obtained when the HUC optical amplifying medium is used can be calculated in accordance with a HUC model shown in the next formula (1).

$$G_{HUC} = \frac{N_2}{N_t} = \frac{I_S\left(\frac{\alpha_S}{hv_S\zeta}\right) + I_P\left(\frac{\alpha_P}{hv_P\zeta}\right)}{\frac{I_S}{hv_S\zeta}(\alpha_S + g*_S) + \frac{I_P}{hv_P\zeta}(\alpha_P + g*_P) + 1 + CN_2\tau} \quad (1)$$

In the above formula, $N_2$ is the number of rare-earth ions in an excitation state, and $N_t$ is the total number of rare-earth ions. Further, $\zeta$ is a saturation coefficient, and to be specific, corresponds to $\pi \times$(rare-earth ions doped radius)$^2 \times$(rare-earth ions density)/(fluorescence lifetime of rare-earth ions). Furthermore, C is the probability of the HUC, h is a Planck's constant, $\tau$ is a carrier lifetime (fluorescence lifetime of rare-earth ions), $\alpha$ is an absorption coefficient of the optical amplifying medium (subscripts S and P respectively corresponds to the signal light and the pumping light, and the same rule will be adopted hereunder), g* is a gain coefficient of the optical amplifying medium, I is the optical intensity and $\upsilon$ is an optical frequency.

Figure 5:
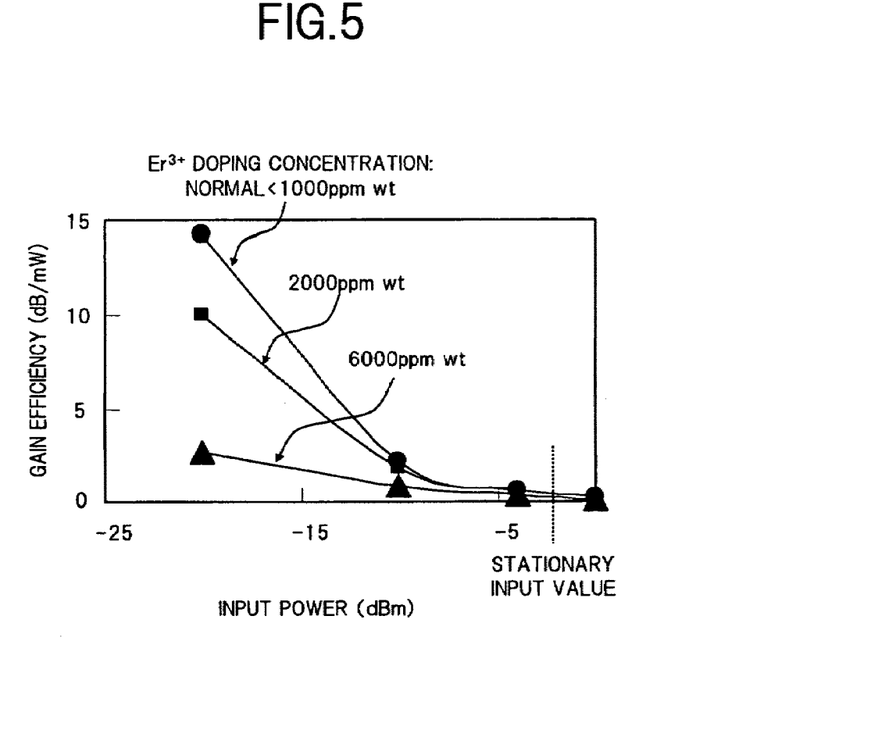
FIG. 5 is a graph showing a simulation result of the gain efficiency to the input power using a HUC model.

FIG. 5 shows a simulation result of the gain efficiency to the input power, using the HUC model. Herein, for example, an erbium-doped fiber (EDF) being a silica-based material is used as the optical amplifying medium. From this simulation result, it is understood that the gain efficiency is significantly degraded when the input power is decreased (the high gain state), as the $Er^{3+}$ doping concentration (mass parts per million) becomes higher from a normal value smaller than 1000 ppm wt to 2000 ppm wt, and further 6000 ppm wt.

Figure 6:
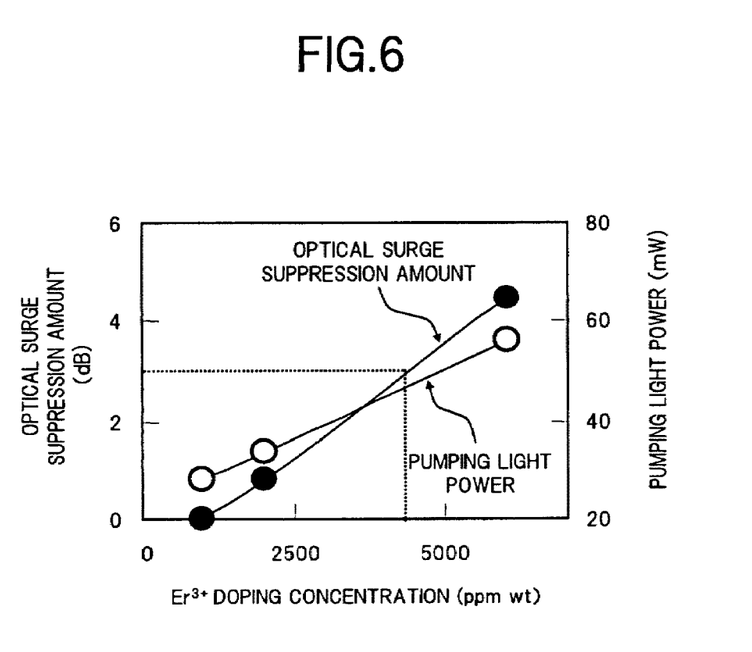
FIG. 6 is a graph showing a simulation result of an optical surge suppression amount relative to the $Er^{3+}$ doping concentration of the HUC optical amplifying medium and the required pumping light power.

FIG. 6 shows a calculation result (the black circle mark) of an optical surge suppression amount to the $Er^{3+}$ doping concentration based on the above simulation result. Incidentally, the optical surge suppression amount is on the basis of the occurrence amount of the optical surge in normal doping concentration (<1000 ppm wt) at which the HUC is not substantially caused. As shown in FIG. 6, it is understood that the optical surge is suppressed by about 5 dB by increasing the $Er^{3+}$ doping concentration up to for example 6000 ppm wt. Here, if a condition is such that the optical surge is required to be suppressed by 3 dB or more for example, it becomes possible to satisfy the above condition by increasing the $Er^{3+}$ doping concentration to be higher than 4500 ppm wt. Note, it is known that, when the $Er^{3+}$ doping concentration exceeds 10000 ppm wt, a phenomenon called migration which is different from the up-conversion phenomenon, is newly caused. Therefore, it is reasonable to consider that an upper limit value of the $Er^{3+}$ doping concentration for when the optical surge is suppressed utilizing the up-conversion phenomenon is 10000 ppm wt.

Further, based on the above simulation result, considering from the viewpoint other than the $Er^{3+}$ doping concentration a condition that an effective optical surge suppression effect can be achieved, when the input power is changed from −4 dBm at the stationary input time to −20 dBm, that is, the input power is decreased by 16 dBm, if it is satisfied that a fluctuation band of the gain efficiency becomes 10 dB or less, the optical surge suppression effect of 3 dB or more can be achieved by applying the HUC optical amplifying medium.

However, in the case of using the optical amplifying medium with which the rare-earth ions are doped in high concentration, as shown in data indicated by the white circle mark of FIG. 6, the pumping light power necessary for realizing a required gain tends to be increased compared with the case of using the optical amplifying medium in normal doping concentration. Namely, the optical surge suppression effect by the up-conversion phenomenon and the increase of the required pumping light power are in a trade-off relation. Therefore, in the case where the up-conversion phenomenon is utilized as optical sure suppression means, it becomes important to design the optical amplifying taking fully into consideration of the increase of the required pumping light power.

Therefore, in the present invention, for the optical amplifier of multi-stages amplification configuration structured by connecting a plurality of optical amplifying mediums in series, the HUC optical amplifying medium is preferentially applied to the amplifying medium having a smaller required gain, so that the effective optical surge suppression can be realized while suppressing the increase of the required pumping light power. Such a consideration of optical amplifier designing is based on characteristics in that, in the optical amplifying medium set with a small gain (namely, the gain saturation is deep) as an operating condition thereof, the large optical surge occurs, and characteristics in that, in the HUC optical amplifying medium, the increase of the required pumping light power is suppressed as the gain becomes smaller.

Hereunder, there will be described specific embodiments of an optical surge suppressive type optical amplifier to which is applied the HUC optical amplifying medium being one aspect of the present invention.

Figure 7:
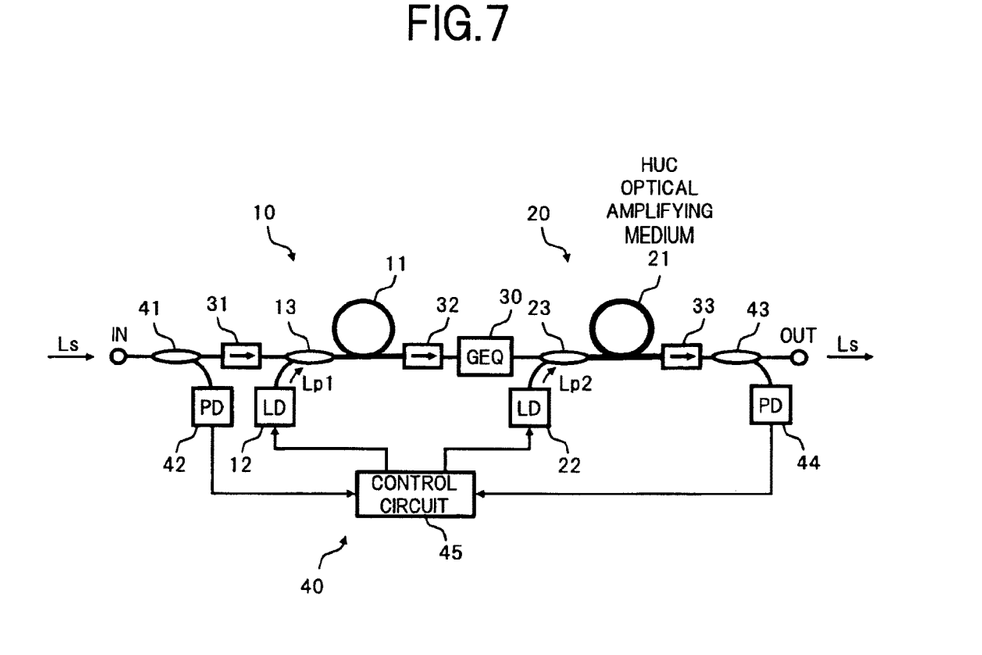
FIG. 7 is a configuration diagram showing one embodiment of the WDM optical amplifier to which the HUC optical amplifying medium is applied.

FIG. 7 is a configuration diagram showing one embodiment of the optical surge suppressive type optical amplifier to which the HUC optical amplifying medium is applied.

In FIG. 7, the optical surge suppressive type optical amplifier in the present embodiment is configured such that, for a WDM optical amplifier of two-stages amplification configuration in which two optical amplifying sections 10 and 20 as optical amplifying means are connected in series between an input port IN and an output port OUT, to and from which for example a WDM light Ls is input and output, a HUC optical amplifying medium 21 is applied to the latter stage optical amplifying section 20 positioned on the output side, and a normal optical amplifying medium 11 is applied to the former stage optical amplifying section 10 positioned on the input side, so that the optical surge can be effectively suppressed while suppressing the increase of the required pumping light power.

To be specific, the latter stage optical amplifying section 20 includes the HUC optical amplifying medium 21, a pumping light source (LD) 22 as a pumping section and a multiplexer 23. As the HUC optical amplifying medium 21, here, there is used for example, an erbium-doped fiber (EDF) doped with erbium ions ($Er^{3+}$) one of rare-earth ions in high concentration within a predetermined region, such as a core or the like of an optical fiber. It is preferable that, in the case of silica-based material, the doping concentration of $Er^{3+}$ is appropriately set within a range of from 4500 ppm wt to 10000 ppm wt in accordance with the above simulation result while keeping a balance with the required pumping light power, and herein, 6000 ppm wt is set as an optimum value.

Further, for the HUC optical amplifying medium 21, it is preferable to co-dope lanthanum (La) or ytterbium (Yb). As a result, proximate $Er^{3+}$ is hard to form the duster, to be uniformly distributed within the doped region, so that the HUC is caused more reliably. Furthermore, as a base material (here, the optical fiber) of the optical amplifying medium, the one is suitable, which contains any one of antimony (Sb), lanthanum (La), lead (Pb), bismuth (Bi), indium (In), zirconium (Zr), hafnium (Hf), tin (Sn), tellurium (Te) and barium (Ba). By using the base material containing the element of large atomic mass as described above, it becomes possible to suppress a lattice variation to prevent phonon relaxation from occurring. As a result, since the lifetime of $Er^{3+}$ remaining at the excitation level ($^4I_{13/2}$) is lengthened so that the HUC transition probability is increased, it is possible to increase characteristics in that the gain efficiency is degraded as the gain is increased. Thus, the optical amplifying medium in which the extra gain increase is less at the time when the input power is decreased (high gain state) is realized, and accordingly, it becomes possible to further effectively suppress the optical surge.

The pumping light source 22 outputs a pumping light Lp2 capable of pumping the rare-earth ions in the HUC optical amplifying medium 21. Here, it is provided that the pumping light Lp2 of 980 nm band or 1480 nm band corresponding to $Er^{3+}$ is sent to the multiplexer 23 from the pumping light source 22. The multiplexer 23 multiplexes the pumping light Lp2 from the pumping light source 22 and the signal light Ls passed through a gain equalizer 30 (to be described later) to supply the multiplexed light to the HUC optical amplifying medium 21.

Incidentally, in FIG. 7, there is shown the forward pumping type configuration example in which the pumping light Lp2 is supplied to the HUC optical amplifying medium 21 from the signal light input end side, and the signal light Ls and the pumping light Lp2 are propagated in the same direction. However, the present invention is not limited to the above configuration, and it is also possible to apply a backward pumping type configuration in which the pumping light Lp2 is supplied to the HUC optical amplifying medium 21 from the signal light output end side, and the signal light Ls and the pumping light Lp2 are propagated in opposite directions from each other, and a bidirectional pumping type configuration in which the pumping lights Lp2 are supplied from both ends of the HUC optical amplifying medium 21. In the present embodiment, there is shown the one example in which the pumping light Lp2 output from a single pumping light source 22 is supplied to the HUC optical amplifying medium 21. However, the configuration may be such that a plurality of pumping light sources is disposed, and the pumping lights output from the respective pumping light sources are multiplexed to be supplied to the HUC optical amplifying medium 21.

On the other hand, for the optical amplifying medium 11 applied to the former stage optical amplifying section 10, the rare-earth ion doping concentration thereof is set at a normal value, that is, a value sufficiently lower than the rare-earth ion doping concentration of the HUC optical amplifying medium 21, at which the up-conversion phenomenon is not substantially caused. Herein, a typical EDF doped with $Er^{3+}$ in concentration of about 1000 ppm wt is used as the optical amplifying medium 11. Similarly to the latter stage optical amplifying section 20, a pumping light Lp1 output from the pumping light source 12 is supplied via the multiplexer 13 to this optical amplifying medium 11.

Further, in the present optical amplifier, the gain equalizer (GEQ) 30 is provided between the former stage optical amplifying section 10 and the latter stage optical amplifying section 20, and also, an optical isolator 31 is connected on the former stage of the optical amplifying section 10, an optical isolator 32 is connected between the former and latter stage optical amplifying sections 10 and 20, and an optical isolator 33 is connected on the latter stage of the optical amplifying section 20. The gain equalizer 30 is a known optical device which equalizes gain wavelength characteristics of the optical amplifying sections 10 and 20 so that the WDM light Ls after amplified has required wavelength characteristics (for example, flat wavelength characteristics in which optical powers of respective wavelengths are uniform). Incidentally, herein, there is shown the configuration example in which the gain equalizer 30 is disposed between the former stage optical amplifying section 10 and the latter stage optical amplifying section 20. However, the arrangement of the gain equalizer 30 is not limited to the above example. Further, in addition to the gain equalizer 30, there may be disposed between the optical amplifying sections 10 and 20, for example, a variable optical attenuator for adjusting an output power level of the present optical amplifier, a dispersion compensator for compensating for the chromatic dispersion occurred in the WDM light Ls and the like.

Further, the present optical amplifier comprises a control section 40 as pumping light control means for controlling the pumping light sources 12 and 22 of the respective optical amplifying sections 10 and 20. The control section 40 comprises: an optical coupler 41 and an photodetector 42, for monitoring the WDM light Ls input to the input port IN; an optical coupler 42 and an photodetector 44, for monitoring the WDM light Ls output from the output port OUT; and a control circuit 45 for controlling driving conditions of the pumping light sources 12 and 22 based on the monitoring results of the photodetectors 42 and 44. The control circuit 45 performs typical controls, such as, an AGC for holding the gain of the present optical amplifier constant, an ALC for holding the output power level of the present optical amplifier constant, and the like.

In the optical amplifier of the above configuration, the WDM light Ls input to the input port IN is supplied to the optical amplifying medium 11 of the former stage optical amplifying section 10 via the optical coupler 41 and the optical isolator 31. To the optical amplifying medium 11, the pumping light Lp1 output from the pumping light source 12 of which driving condition is controlled by the control circuit 45 is supplied via the multiplexer 13, and accordingly, the WDM light Ls is amplified by the stimulated emission of $Er^{3+}$ pumped by the pumping light Lp1. The WDM light Ls amplified by the former stage optical amplifying section 10 is supplied via the optical isolator 32 to the gain equalizer 30 so that gain wavelength characteristics in the optical amplifying section 10 and 20 are compensated, and thereafter, is supplied to the HUC optical amplifying medium 21 of the latter stage optical amplifying section 20. To the HUC optical amplifying medium 21, the pumping light Lp2 output from the pumping light source 22 of which driving condition is controlled by the control circuit 45 is supplied via the multiplexer 23, and accordingly, the WDM light Ls is amplified by the stimulated emission of $Er^{3+}$ pumped by the pumping light Lp2. The WDM light Ls amplified by the latter stage optical amplifying section 20 is output from the output port OUT via the optical isolator 33 and the optical coupler 43 to the outside.

Generally, in the optical amplifier of two-stages amplification configuration, in order to achieve excellent noise characteristics, the gain for the former stage optical amplifying section of which stationary input power is small is set to be larger than the gain for the latter stage optical amplifying section of which stationary input power is large. To be specific, for example, to the former stage optical amplifying section of which stationary input power is −22 dBm/ch, a stationary gain is set at 22 dB, whereas to the latter stage optical amplifying section of which stationary input power is −7 dBm/ch, the stationary gain is set at 9 dB. In such gain setting, in the case where the power of the WDM light Ls input to the optical amplifier is abruptly decreased due to a change in channel numbers or the like, if the normal optical amplifying mediums are used for both of the optical amplifying sections (the configuration of the conventional optical amplifier), the gain saturation occurred in the latter stage optical amplifying section which is operated at a relatively lower gain becomes deeper than that in the former stage optical amplifying section, so that a larger optical surge occurs in the latter stage optical amplifying section. To be specific, in the above gain setting example, the optical surge of 8 dB occurs in the former stage optical amplifying section, whereas the optical surge of 13 dB occurs in the latter stage optical amplifying section, for example.

Figure 3:
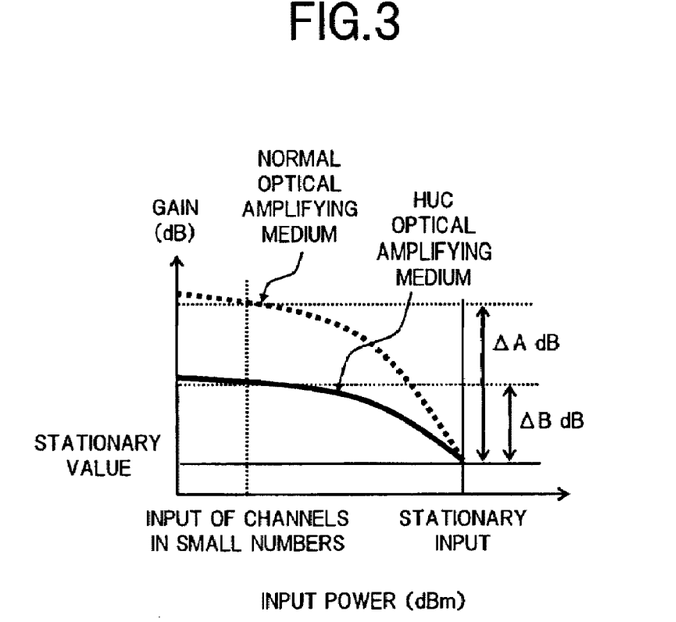
FIG. 3 is a graph showing a relation between a gain and the input power in a WDM optical amplifier using a HUC optical amplifying medium.
Figure 4:
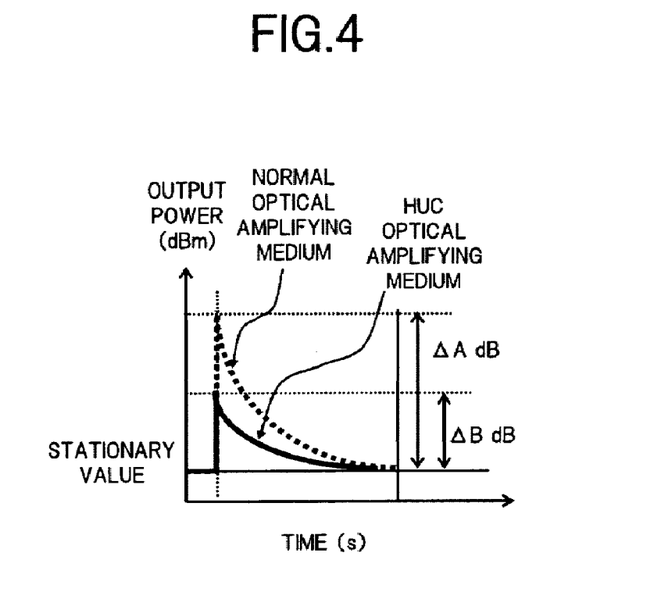
FIG. 4 is a graph showing an optical surge occurrence state for when the input power is decreased, in the WDM optical amplifier using the HUC optical amplifying medium.

Contrary to the above, in the optical amplifier of the present embodiment, since the HUC optical amplifying medium 21 is applied to the latter stage optical amplifying section 20, the extra gain increase at the time when the input power is decreased can be suppressed as shown in FIG. 3. The gain efficiency in the HUC optical amplifying medium 21 is degraded at the response speed in nanosecond order, and therefore, the occurrence amount of optical surge in the latter stage optical amplifying section 20 can be decreased as shown in FIG. 4.

As described in the above, by applying the HUC optical amplifying medium 21, the required pumping light power for the latter stage optical amplifying section 20 is increased compared with the case where the normal optical amplifying medium is used. However, an increase amount thereof can be suppressed to be comparatively less, since the latter stage optical amplifying section 20 is operated at the relatively low gain. In other words, assuming that the HUC optical amplifying medium is applied to the former stage optical amplifying section 10, since the former stage optical amplifying section is operated at the relatively high gain, the increase amount of the required pumping light power becomes large.

According to the present embodiment as described in the above, for the WDM optical amplifier of two-stages amplification, by selectively applying the HUC optical amplifying medium 21 to the latter stage optical amplifying section 20, it becomes possible to effectively suppress the optical surge occurred in the overall optical amplifier, while suppressing the increase of the required pumping light power due to the application of the HUC optical amplifying medium 21. Further, the optical circuit configuration of the present embodiment can be realized by replacing the optical amplifying medium in a typical plural stages amplification configuration, and does not lead the complexity of optical circuit configuration differently from the conventional gain clamping method. Therefore, it is possible to realize the WDM optical amplifier capable of suppressing the optical surge at a low cost. Such a WDM optical amplifier having the optical surge suppression effect is suitable for an optical amplifier arranged on a position just after the site with the high probability of optical surge in the optical communication system, where the channel numbers of the WDM light are dynamically changed, (to be specific, on the latter stage of the output side multiplexer in which the channel lights are multiplexed in an OADM node as shown in FIG. 12).

Incidentally, in the above embodiment, the description has been made on the WDM optical amplifier of two-stages amplification configuration. However, the present invention is effective for the three or more stages amplification configuration. In the configuration of three or more stages, the HUC optical amplifying medium is applied to an optical amplifying section of which required gain is smaller among a plurality of optical amplifying sections connected in series, so that operation and effect same as those of the above embodiment can be achieved. Further, in the above embodiment, in order to suppress the increase of the required pumping light power, the HUC optical amplifying medium is applied to the latter stage optical amplifying section. However, for example, if the output power of the pumping light source is sufficient, and accordingly, there is not need to particularly consider the increase of the required pumping light power, the HUC optical amplifying medium can be applied to an arbitrary optical amplifying section. Relating to this, the present invention is also effective for the case where the HUC optical amplifying medium is applied to a WDM optical amplifier of single-stage amplification configuration, since the optical surge suppression effect can be achieved.

Next, there will be described an optical amplifier for suppressing the optical surge utilizing the pair induced quenching (PIQ), as another aspect of the present invention.

Figure 8:
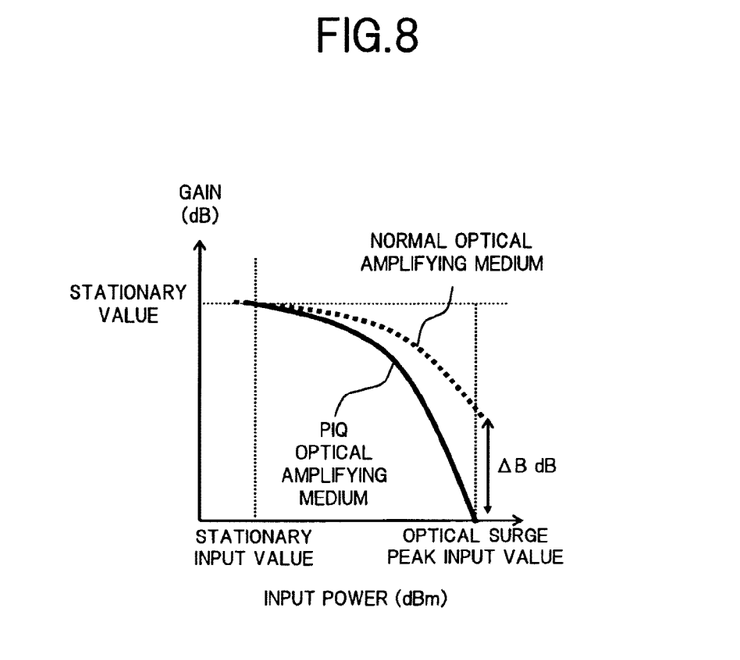
FIG. 8 is a graph showing a relation between a gain and the input power in a one wave optical amplifier using a PIQ optical amplifying medium.
Figure 9:
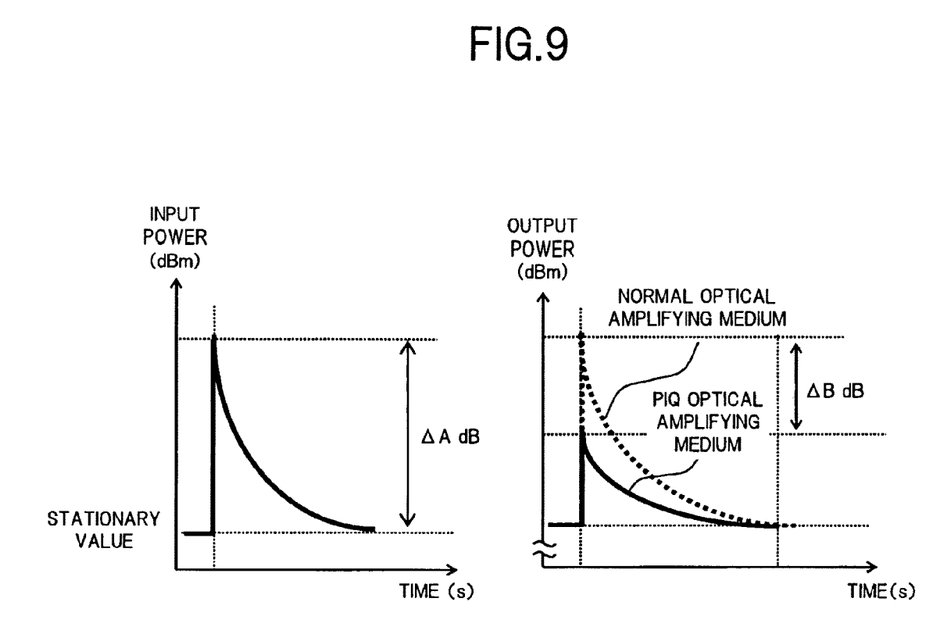
FIG. 9 shows graphs for explaining an optical surge suppression effect in the one wave optical amplifier using the PIQ optical amplifying medium.

In the case where an optical amplifier is configured using an optical amplifying medium capable of causing the PIQ phenomenon (to be referred to as a PIQ optical amplifying medium hereunder), a relation of a gain to the input power is different from that in the case where the HUC optical amplifying medium is used, and as shown in FIG. 8 for example, the gain efficiency is degraded at the response speed in nanosecond order when the input power is increased (the low gain state) relatively to the characteristics (broken line) of the normal optical amplifying medium in which the up-conversion phenomenon is not caused. Taking notice of characteristics of such a PIQ optical amplifying medium, for example, by applying the PIQ optical amplifying medium to an optical amplifier for amplifying a signal light of single wavelength in a reception end or the like of the optical communication system, it becomes possible to suppress the amount of optical surge which occurs in an optical repeater or the like on a transmission path to be accumulated, and reaches the reception end to be input to a one wave optical amplifier. Namely, the signal light input to the one wave optical amplifier arranged on the reception end or the like, is at a significantly low level in a stationary state as shown on the left side of FIG. 9 for example, and an input level thereof is abruptly increased when the optical surge occurred in the optical repeater or the like to be accumulated reaches the reception end. A change of the input power due to the optical surge corresponds to a change in FIG. 8, in which the high gain state at the stationary input time is transited to the low gain state due to the abrupt increase of the input power. The decrease of the gain occurring due to the increase of the input power is larger by $\Delta BdB$ when the PIQ optical amplifying medium is used (solid line of FIG. 8) compared with the case where the normal optical amplifying medium of which gain change amount is normal is used (broken line of FIG. 8). Therefore, by applying the PIQ optical amplifying medium to the one wave optical amplifier arranged on the reception end or the like, as shown in the right side of FIG. 9, it becomes possible to suppress the optical surge output from the optical amplifier by $\Delta BdB$.

A gain $G_{PIQ}$ obtained in the case of using the PIQ optical amplifying medium can be calculated in accordance with a PIQ model shown in the following formula (2), similarly to the gain $G_{HUC}$ in the case of using the HUC optical amplifying medium.

$$G_{PIQ} = \frac{N_2}{Nt} = \frac{(1-2k)\left\{I_S\left(\frac{\alpha_S}{hv_S\zeta}\right) + I_P\left(\frac{\alpha_P}{hv_P\zeta}\right)\right\}}{\frac{I_S}{hv_S\zeta}(\alpha_S + g*_S) + \frac{I_P}{hv_P\zeta}(\alpha_P + g*_P) + 1} + \frac{(2k)\left\{I_S\left(\frac{\alpha_S}{hv_S\zeta}\right) + I_P\left(\frac{\alpha_P}{hv_P\zeta}\right)\right\}}{\frac{I_S}{hv_S\zeta}(\alpha_S + g*_S) + \frac{I_P}{hv_P\zeta}(\alpha_P + g*_P) + (m-1)\left\{I_S\left(\frac{\alpha_S}{hv_S\zeta}\right) + I_P\left(\frac{\alpha_P}{hv_P\zeta}\right)\right\} + 1} \quad (2)$$

In the above formula, k is a duster forming rate, and m is the number of ions forming the duster.

Figure 10:
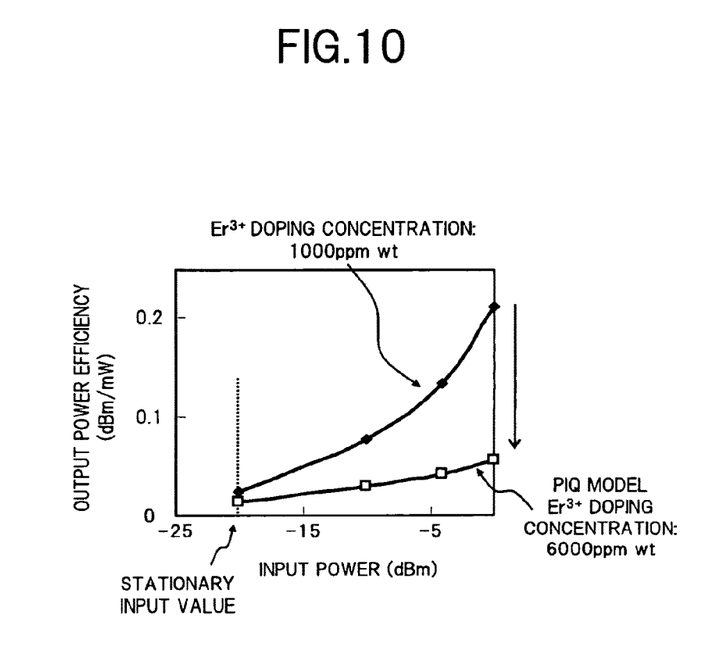
FIG. 10 is a graph showing a simulation result of the output power efficiency relative to the input power using a PIQ model.

FIG. 10 shows a simulation result of the output power efficiency (a value obtained by dividing the output power [dBm] by the pumping light power [mW]) relative to the input power, using the above PIQ model. Herein, for example, the erbium-doped fiber (EDF) is used as the optical amplifying medium. From this simulation result, it is understood that the $Er^{3+}$ doping concentration is increased from 1000 ppm wt to 6000 ppm wt, so that the output power efficiency is largely decreased when the power is increased due to the input of optical surge.

As a result that the above simulation is performed by changing the $Er^{3+}$ doping concentration, as a condition that the optical surge can be suppressed by 3 dB or more in the case where the PIQ optical amplifying medium is used to configure the one wave optical amplifier, it is appropriate to set the $Er^{3+}$ doping concentration at 4500 ppm wt to 10000 ppm wt, similarly to the case of the HUC optical amplifying medium. Further, for example, also in the case where a condition that a fluctuation band of the output power efficiency becomes 7 dB or less is satisfied when the input power is changed from −20 dBm at the stationary input time to 0 dBm, that is, the input power is increased by 20 dBm, the optical surge suppression effect of 3 dB or more can be achieved by applying the PIQ optical amplifying medium. Note, the output power efficiency fluctuation band of 7 dB or less means $\log_{10}$ {(output power efficiency at large input power)/(output power efficiency at small input power)}<7 dB. However, the output power efficiency is (output power [dBm])/(pumping light power [mW]).

Incidentally, also for the PIQ optical amplifying medium, the optical surge suppression effect and the increase of the required pumping light power are in a trade-off relation, similarly to the HUC optical amplifying medium. However, in the case of the one wave optical amplifier arranged on the reception end or the like, since the power of the input signal light is weak and the required pumping light at the stationary input time is also low, even if the required pumping light power is increased by applying the PIQ optical amplifying medium, it can be considered that an existent pumping light source can cope with such an increase of the required pumping light power. Therefore, in the case of utilizing the PIQ optical amplifying medium, there is the low necessity of performing the design considering the increase of the required pumping light power as in the HUC optical amplifying medium.

Figure 11:
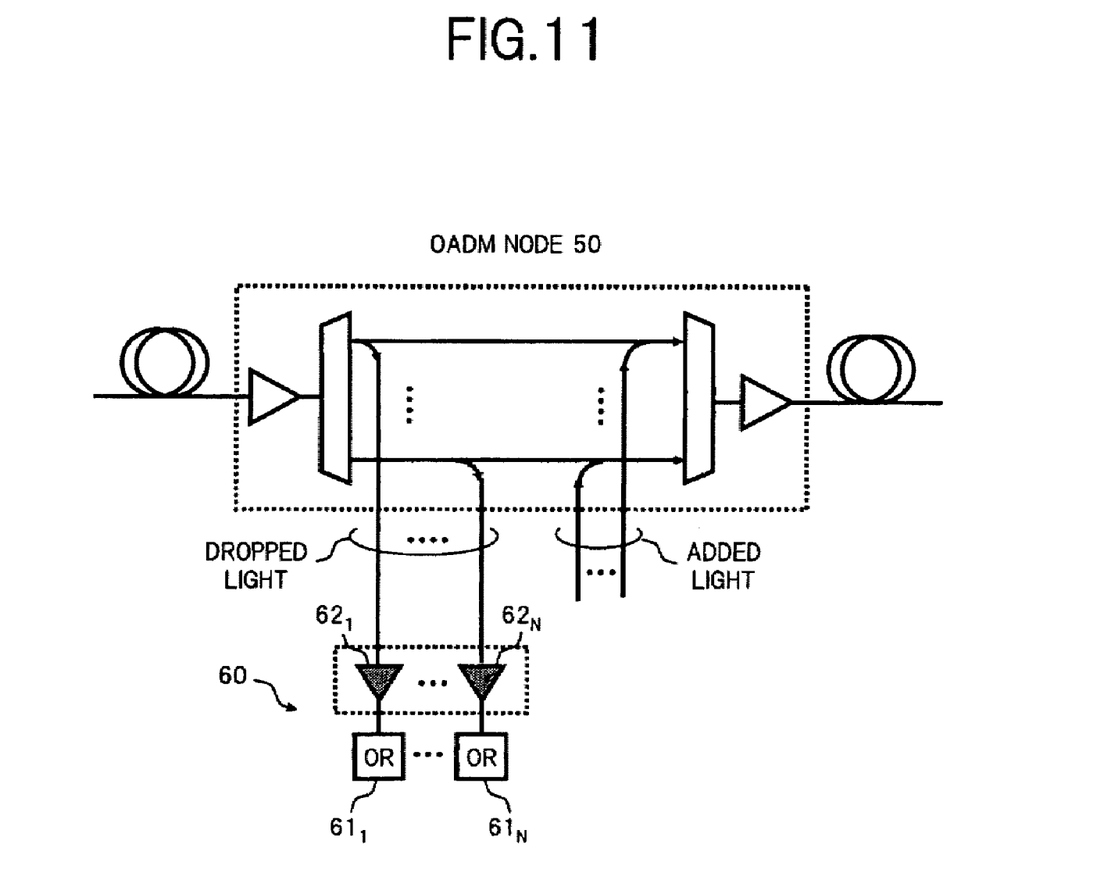
FIG. 11 is a diagram showing a specific example of an optical communication system arranged with the one wave optical amplifier to which the PIQ optical amplifying medium of the present invention is applied.

FIG. 11 is a specific example of an optical communication system arranged with the one wave optical amplifier to which the PIQ optical amplifying medium is applied.

In FIG. 11, the one wave optical amplifier to which the PIQ optical amplifying medium is applied, is used as, for example, each of pre-amplifiers $62_1$ to $62_N$ arranged on input stages of optical receivers (OR) $61_1$ to $61_N$ of a terminal station 60 to which signal lights (dropped lights) of respective wavelengths dropped by an OADM node 50 are sent. In the case where each of the preamplifiers $62_1$ to $62_N$ is in a single-stage amplification configuration using a single optical amplifying medium, the PIQ optical amplifying medium is applied to each optical amplifying medium. Further, in the case where each of the preamplifiers $62_1$ to $62_N$ is in a multi-stages amplification configuration in which a plurality of optical amplifying mediums is connected in series, the PIQ optical amplifying medium is applied preferentially to an optical amplifying medium of low stationary input level, that is, an optical amplifying medium on the signal light input side.

Incidentally, as the PIQ optical amplifying medium applied to each of the pre-amplifiers $62_1$ to $62_N$, it is preferable to use the EDF of which $Er^{3+}$ doping concentration is set within a range of 4500 ppm wt to 10000 ppm wt in accordance with the above simulation result, and also to use the one with which lanthanum (La) or ytterbium (Yb) is not co-doped so that the duster is easily formed in the doped region.

In the one wave optical amplifier to which the above PIQ optical amplifying medium is applied, even if the optical surge accumulated to become large in the optical communication system is input, it becomes possible to effectively suppress the optical surge by the degradation of output power efficiency in the PIQ optical amplifying medium, to output the signal light to each of the latter stage optical receivers $61_1$ to $62_N$. Therefore, differently from the conventional high-speed control method of the pumping light power, it becomes unnecessary to take measures of forcibly controlling the pumping light power to avoid the output of optical surge to each of the latter stage optical receivers $61_1$ to $61_N$ in the case where the optical surge is input to each of the preamplifiers $62_1$ to $62_N$. Thus, it becomes possible to realize with a simple configuration that the pumping light source for each of the preamplifiers $62_1$ to $62_N$ is made to be common and a splitter is simultaneously used to thereby distribute the pumping light to each of the pre-amplifiers $62_1$ to $62_N$. Further, since the variable optical attenuator for pumping system becomes unnecessary, it becomes possible to achieve the miniaturization of the pre-amplifier corresponding to each wavelength.

Incidentally, in FIG. 11, there has been described the one example in which the one wave optical amplifier to which the PIQ optical amplifying medium is applied is used as the pre-amplifier arranged on the former stage of the optical receiver. However, surely, it is also possible to apply the PIQ optical amplifying medium to a one wave optical amplifier other than the pre-amplifier.

What is claimed is:

1. An optical surge suppressive type optical amplifier comprising;
   a plurality of optical amplifying means each including an optical amplifying medium doped with at least rare-earth ions and a pumping section that supplies a pumping light to said optical amplifying medium, for amplifying a wavelength division multiplexed light input thereto by the stimulated emission of the rare-earth ions pumped by the pumping light from said pumping section, and said respective optical amplifying means being connected in series,
   wherein said optical amplifying medium the optical amplifying means arranged on the signal light output side among said plurality of optical amplifying means, is doped with the rare-earth ions substantially in uniform in high concentration within a predetermined region, and has a structure capable of causing a phenomenon in which the gain efficiency degradation is increased as a gain becomes larger, said optical amplifying means arranged on the signal light output side is configured to suppress an optical surge by the degradation of gain efficiency utilizing said phenomenon which is caused when the power of the input wavelength division multiplexed light is decreased.

2. An optical surge suppressive type optical amplifier according to claim 1,
   wherein said optical amplifying medium in said optical amplifying means arranged on the signal light output side is doped with erbium ions, and the doping concentration of the erbium ions is set at a value higher than 4500 ppm wt, and also, lower than 10000 ppm wt.

3. An optical surge suppressive type optical amplifier according to claim 1,
   wherein said optical amplifying medium in said optical amplifying means arranged on the signal light output side has a structure in which a fluctuation band of the gain efficiency becomes 10 dB or less when the total power of the input wavelength division multiplexed light is decreased by 16 dB from a previously set stationary input level.

4. An optical surge suppressive type optical amplifier according to claim 1,
   wherein said optical amplifying medium in said optical amplifying means arranged on the signal light output side is co-doped with lanthanum (La) or ytterbium (Yb).

5. An optical surge suppressive type optical amplifier according to claim 1,
   wherein said optical amplifying means in said optical amplifying means arranged on the signal light output side is made up by using a base material containing any one of antimony (Sb), lanthanum (La), lead (Pb), bismuth (Bi), indium (In), zirconium (Zr), hafnium (Hf), tin (Sn), tellurium (Te) and barium (Ba).

6. An optical surge suppressive type optical amplifier according to claim 1, further comprising;
   pumping light control means for monitoring an input state and an output state of said wavelength division multiplexed light, to control the pumping section of said each optical amplifying means based on the monitoring result.

7. An optical surge suppressive type optical amplifier comprising;
   a plurality of optical amplifying means each including an optical amplifying medium doped with rare-earth ions and a pumping section that supplies a pumping light to said optical amplifying medium, for amplifying a signal light of single wavelength input thereto by the stimulated emission of the rare-earth ions pumped by the pumping light from said pumping section, and said respective optical amplifying means being connected in series,
   wherein said optical amplifying medium, in the optical amplifying means arranged on the signal light output side among said plurality of optical amplifying means, is doped with the rare-earth ions in high concentration within a predetermined region, and has a structure capable of causing a phenomenon in which the output power efficiency degradation is increased as the input power becomes larger, wherein said optical amplifying means arranged on the signal light output side is configured to suppress an optical surge by the degradation of output power efficiency utilizing said phenomenon which is caused when the power of the input signal light is increased.

8. An optical surge suppressive type optical amplifier according to claim 7,
   wherein said optical amplifying medium in said optical amplifying means arranged on the signal light output side is doped with erbium ions, and the doping concentration of the erbium ions is set at a value higher than 4500 ppm wt, and also, lower than 10000 ppm wt.

9. An optical surge suppressive type optical amplifier according to claim 7,
   wherein said optical amplifying medium in said optical amplifying means arranged on the signal light output side has a structure in which a fluctuation band of the output power efficiency becomes 7 dB or less when the total power of the input signal light is increased by 20 dB from a previously set stationary input level.

* * * * *